Patented June 17, 1930

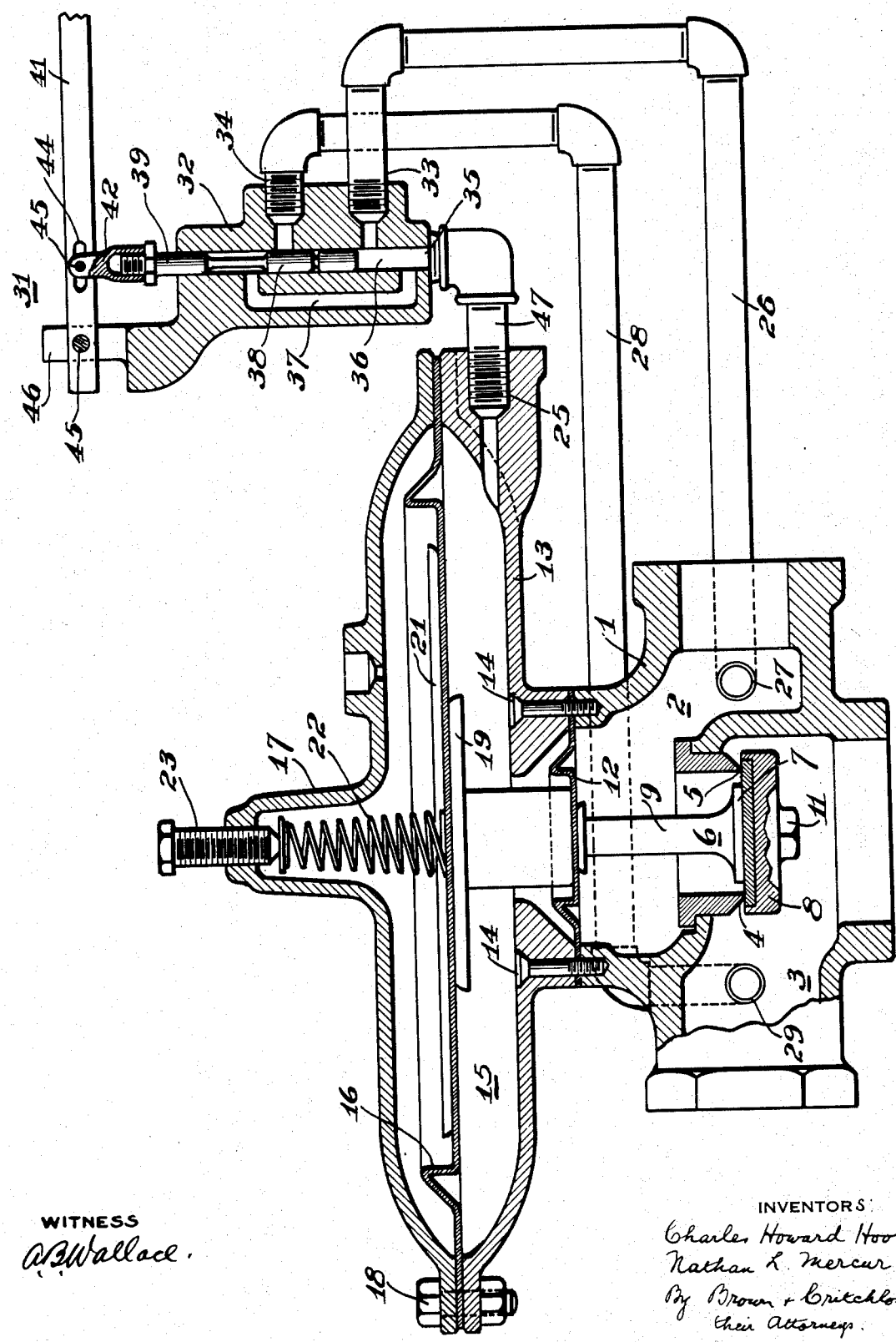

1,764,790

UNITED STATES PATENT OFFICE.

CHARLES HOWARD HOOK, OF PITTSBURGH, AND NATHAN L. MERCUR, OF McKEESPORT, PENNSYLVANIA

PRESSURE-REGULATING AND SHUT-OFF VALVE

Application filed June 28, 1928. Serial No. 289,026.

The invention relates to pressure regulating and pressure shut-off valve apparatus and more especially to a combination of the two.

Heretofore it has been the customary practice to employ reducing or regulating valves for controlling the flow of fluid under pressure from one system to another where it is desired to regulate the pressure of the fluid in the second system, and to employ a separate shut-off valve where, for any reasons other than for regulating the pressure in the low pressure system, it is desired to shut off the flow of fluid.

The object of this invention generally stated is to provide a combination regulating and shut-off valve mechanism which is adapted to operate as either a regulating or a shut-off valve, and which may be placed in a system and caused automatically to function in either capacity.

It is also an object of the invention to provide a valve mechanism of the above described character which may be controlled from a remote position.

Other objects will become apparent, and a more complete understanding of the invention will be had, when the following detailed description is read in conjunction with the accompanying drawing wherein the single figure illustrates a vertical cross section of the preferred embodiment of the invention.

In the practice of this invention there is provided a valve casing having an inlet chamber, an outlet chamber and a pressure chamber. Between the inlet and the outlet chamber there is a valve regulated opening in which is disposed a valve, and between the inlet chamber and the pressure chamber there is a flexible partition. For operating the valve in the opening between the inlet chamber and the outlet chamber a pressure responsive diaphragm is provided in the pressure chamber to which the valve is connected. This connection is made by means of a valve stem which is attached to the flexible partition between the inlet chamber and the pressure chamber and to the pressure responsive diaphragm. By employing a flexible partition between these chambers and securely connecting the valve stem to it, leakage between these two chambers is effectively prevented. For rendering the valve actuating diaphragm responsive to the pressure in the outlet chamber of the valve so that the flow of fluid through the valve may be regulated by that pressure, a valve control passage is provided between the outlet chamber and the pressure chamber, and for rendering the valve actuating diaphragm responsive to the pressure in the inlet chamber whereby to make it operate as a shut-off valve to shut off the flow of fluid through the valve, another valve regulating passage is provided between the inlet chamber and the pressure chamber, and means is provided for operating the valve in these passages to select which pressure will be introduced into the pressure chamber.

Referring now to the drawing, the valve mechanism illustrated comprises a main casing 1 having inlet and outlet ports leading respectively into an inlet chamber 2 and an outlet chamber 3. Between the two chambers is a valve opening 4 around the periphery of which is fitted a valve seat 5. The flow of fluid through the valve opening 4 is controlled by a valve 6, which valve comprises a fiber gasket 7 supported by a metal disk 8 attached to a valve stem 9 by a nut 11. Gasket 7, which is preferably formed of some yieldable material, is adapted to firmly contact with valve seat 5 to prevent the flow of any fluid through the valve when it is closed.

Across the top of casing 1 is extended a flexible partition or diaphragm 12 which is held in place by upper section 13 of the valve casing. This upper section is firmly mounted on lower casing 1 by means of bolts 14 or other suitable devices and forms the bottoms and walls of a pressure chamber 15. The upper wall of pressure chamber 15 comprises a flexible pressure responsive valve actuating diaphragm 16 which is held in place by a cap housing 17 which is fitted over and secured to casing 13 by means of bolts 18. Valve stem 9 is passed through and securely attached to a point intermediate of its two ends to flexible partition 12, and at its upper end to pressure responsive diaphragm 16. The connection between the valve stem and the pressure responsive diaphragm is reinforced by disks 19 and 21 placed underneath and on top of the diaphragm. By providing a flexible partition between chambers 2 and 15 and connecting the valve stem to it in the above described manner, valve 6 may be operated by means of the pressure responsive diaphragm, and the fluid in chamber 2 effectively prevented from leaking into chamber 15 or vice versa.

A coil spring 22 is placed inside of cap housing 17 with its lower end bearing upon the center of the diaphragm supporting disk 21, and its upper end engages an adjustable screw 23 threaded into an opening in the top center of the cap member. The purpose of this spring and its adjustable upper support is to provide resilient means for exerting pressure upon diaphragm 16 which may be adjusted to regulate the pressure necessary to actuate the diaphragm whereby the operation of valve 6 may be regulated. A vent 24 is provided in cap housing 17 to overcome any pressure that may be exerted on the upper side of diaphragm 16 when it is actuated, and an opening 25 is provided in casing 13 to permit the introduction of fluid under pressure into pressure chamber 15.

For establishing communication between inlet chamber 2 and pressure chamber 15 a conduit 26 is fitted into a port 27 disposed in the inlet chamber side of casing 1, and for establishing communication between outlet chamber 3 and pressure chamber 15 a conduit 28 is fitted into a port 29 disposed in the outlet side of casing 1. In order that only one of these chambers will be connected to the pressure chamber at one time, and to choose which one will be so connected, an auxiliary valve 31 is provided. This valve may take various forms and shapes and be operated in a number of different ways, but it is here illustrated as a simple sleeve double acting valve consisting of a casing 32 having two inlet openings 33 and 34 and an outlet opening 35, which openings are connected together by valve bore 36 and a passage 37. A sleeve valve 38 attached to a valve stem 39 is fitted in bore 36 and adapted to be operated by a lever 41 to which it is attached by means of a connector 42 having a pin 43 disposed in a slot 44 in the lever. Lever 41 is pivotally attached at 45 to a projection 46 formed on the upper portion of casing 32 whereby the lever may be operated upwardly or downwardly to effect the closing or opening of either one or the other of the inlet openings. Valve 38 is made sufficiently long enough so that it operates as a double valve and does not uncover one of the inlet openings until the other one is entirely closed. Conduits 26 and 28 are fitted into inlets 33 and 34, respectively, and a conduit 47 is connected between outlet opening 35 of the auxiliary valve and port 25 disposed in the casing 13 of the pressure chamber.

With valve 38 in its lower position, communication is established between outlet chamber 3 and pressure chamber 15 whereby the outlet pressure of the main valve is introduced into the pressure chamber and impressed upon the valve actuating pressure responsive diaphragm 16 rendering it responsive to that pressure. Hence it will function as a regulating valve. The pressure at the outlet side of the valve is determined by the pressure exerted by spring 22 upon the diaphragm. When valve 38 is moved to its uper position inlet opening 34 in the auxiliary valve is closed, and inlet opening 33 is opened whereby communication is established between inlet chamber 2 and pressure chamber 15, and the pressure in the inlet chamber is thereby introduced into the pressure chamber impressing the high pressure upon the pressure responsive diaphragm 16, and because of the differences between the pressure in the inlet chamber and the outlet chamber and also on account of adjustment of spring 22, diaphragm 16 will be caused to move upwardly to close valve 6, shutting off the flow of liquid through the valve, thus causing it to operate as a shut-off valve.

It will be readily seen that such a valve mechanism can be employed for either a regulating valve or a shut off valve or it may be disposed in a system and caused to function in both capacities in which case it does away with the necessity of employing both a regulating and a shut-off valve. A particular example of a use for which this valve mechanism is especially adapted is found in a gas burning heating system such as in furnaces and boilers in which it is employed to regulate the flow of gas to the burners and also to shut-off the flow when for any reason that is desired. In such an installation, the auxiliary valve may be operated manually, but preferably it will be arranged to be operated automatically, that is, the lever of the auxiliary valve may be connected to respond to various mechanism, such as electrical devices, the boiler damper control, or a thermal or water level control device whereby the valve may be caused to close if the pressure in the boiler becomes too high; if one of the pilot burners goes out, or if the water in the boiler falls below a safe margin. In such instances the auxiliary valve may be placed at any distance from the main valve whereby remote control is provided for the system, or in some instances a number of auxiliary valves may be connected in a system in such a way that the main valve mechanism will be caused to operate as either a regulating valve or a shut-off valve in response to the operation of any one of the auxiliary valves.

According to the provisions of the patent statutes, we have explained the principle and operation of our invention and have illustrated and described what we now consider to be its best embodiment. However, we desire to have it understood that, within the scope of the appended claims, the invention may be practiced otherwise than as specifically illustrated and described.

We claim:

1. A combination fluid regulating and shut-off valve mechanism, comprising a casing having an inlet chamber an outlet chamber and a pressure chamber, said inlet and outlet chambers being connected by a valve regulated opening, a valve disposed in said opening, pressure responsive means in said pressure chamber connected to said valve, means establishing communication between said inlet chamber and said pressure chamber, means establishing communication between said outlet chamber and said pressure chamber, and independently operable means for positively opening and closing said communicating means whereby said pressure responsive means may be rendered solely responsive to the pressure in the inlet chamber to close the valve or to the pressure in the outlet chamber to automatically actuate the valve to regulate the flow of fluid through the valve opening.

2. A combination fluid regulating and shut-off valve mechanism, comprising a casing having an inlet chamber an outlet chamber and a pressure chamber, an opening connecting said inlet and said outlet chamber, a valve controlling said opening, a flexible partition between said pressure chamber and one of said other chambers, a flexible pressure responsive diaphragm disposed in said pressure chamber, means connecting said pressure responsive diaphragm to said flexible partition and to said valve, a passage between said inlet chamber and said pressure chamber, a passage between said outlet chamber and said pressure chamber, and a selector valve arranged in said passage and operable independently of the pressure in the valve mechanism for selectively opening and closing the passages between the inlet and outlet chamber and the pressure chamber whereby the pressure responsive diaphragm is rendered solely responsive to the pressure in either the inlet chamber to positively close the first mentioned valve or to the pressure in the outlet chamber to cause the valve to function as an automatically operable pressure responsive regulating valve.

3. A combination fluid regulating and shut-off valve mechanism, comprising a valve casing having an inlet chamber an outlet chamber and a pressure chamber, said inlet chamber and said outlet chamber being connected by a valve regulated opening, a valve disposed in said opening, a pressure responsive member disposed in said pressure chamber, means connecting said pressure responsive member to said valve, means for connecting said outlet chamber to said pressure chamber, means for connecting said inlet chamber to said pressure chamber, and means operable independently of the pressure in the valve mechanism for positively opening and closing each of said chamber connecting means, whereby said pressure responsive valve actuating member is made responsive solely to either the pressure in the inlet chamber to positively close the valve or to the pressure in the outlet chamber to effect the operation of the valve as an automatic regulating valve.

4. A combination fluid pressure regulating and shut-off valve mechanism, comprising a valve casing having an inlet and an outlet chamber connected by an opening, a valve controlling said opening, another chamber having a pressure responsive member disposed therein, means connecting said member to said valve, a spring adapted to bear upon said member, means for adjusting the pressure of said spring, a conduit for establishing communication between said inlet chamber and said pressure chamber, another conduit for establishing communication between said outlet chamber and said pressure chamber, an auxiliary valve mechanism for selecting which of said chambers will be connected to said pressure chamber, said auxiliary valve mechanism comprising a valve casing having two inlets and one outlet connected together by an opening, said inlet chamber conduit being connected to one of said auxiliary valve inlets, said outlet chamber conduit being connected to said other auxiliary valve inlet, said auxiliary valve outlet being connected to said pressure chamber, a selector valve in said auxiliary valve casing, and means operable independently of the pressure in the valve mechanism for actuating said selector valve to render said pressure responsive member positively responsive to either the pressure in said inlet chamber to close the first mentioned valve or to the pressure in the outlet chamber to effect the operation of said first mentioned valve as an automatic regulating valve.

5. A combination fluid regulating and shut-off valve mechanism, comprising a valve casing having an inlet chamber and an outlet chamber connected by a valve controlled opening, a valve seat surrounding said opening, a valve for regulating said opening, said valve comprising a gasket reinforced by a metal disk, said gasket being adapted to seat on the seat surrounding the opening, a pressure chamber in said casing, a pressure responsive diaphragm disposed in said pressure chamber and connected to said valve, a spring adapted to bear upon said diaphragm, means for adjusting the pressure of said spring, means for establishing communication between said inlet chamber and said diaphragm chamber, means for establishing communication between said outlet chamber and said diaphragm chamber, selective means interposed in said communicating means and operable independently of the pressure in the valve mechanism for positively selecting which of said inlet or outlet chambers will be connected to said pressure chamber whereby said diaphragm will be rendered solely responsive to either the fluid pressure in the inlet chamber to positively close the valve or to the pressure in the outlet chamber to effect the operation of the valve as an automatic pressure responsive regulating valve.

6. A combination fluid regulating and shut-off valve mechanism comprising a casing having an inlet chamber and an outlet chamber connected by a valve regulated opening, a valve disposed in said opening, pressure responsive means for actuating said valve, and independently operable means for rendering said pressure responsive means responsive to either the pressure in said outlet chamber whereby said valve is caused to operate automatically as a regulating valve or for rendering said pressure responsive means responsive to the pressure in the inlet chamber to positively close said valve whereby it is caused to function as a shut-off valve.

7. A combination fluid regulating and shut-off valve mechanism comprising a casing having an inlet and an outlet chamber connected by a valve regulated opening, pressure responsive means for operating said valve, said means being adapted to be rendered responsive to either the pressure in said inlet or said outlet chamber and when responsive to the pressure in the inlet chamber to positively close said valve and maintain it closed, and when responsive to the pressure in the outlet chamber to cause the valve to function as a regulating valve to maintain a selected pressure in the outlet chamber, and means for selecting which pressure the pressure responsive means will be responsive to.

In testimony whereof, we hereunto sign our names.

CHARLES HOWARD HOOK.
NATHAN L. MERCUR.